(12) United States Patent
Spaulding et al.

(10) Patent No.: US 7,298,892 B2
(45) Date of Patent: Nov. 20, 2007

(54) PRODUCING A BALANCED DIGITAL COLOR IMAGE HAVING MINIMAL COLOR ERRORS

(75) Inventors: Kevin E. Spaulding, Spencerport, NY (US); Geoffrey J. Woolfe, Penfield, NY (US); Edward J. Giorgianni, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 917 days.

(21) Appl. No.: 10/410,550

(22) Filed: Apr. 9, 2003

(65) Prior Publication Data

US 2004/0202365 A1 Oct. 14, 2004

(51) Int. Cl.
*G06K 9/00* (2006.01)
(52) U.S. Cl. .................. 382/167; 348/232; 347/19; 345/207
(58) Field of Classification Search ............... 382/162, 382/167; 356/326; 348/232
See application file for complete search history.

(56) References Cited

U.S. PATENT DOCUMENTS

| | | | |
|---|---|---|---|
| 4,101,217 A | 7/1978 | Fergg et al. | |
| 4,707,119 A | 11/1987 | Terashita | |
| 4,945,406 A | 7/1990 | Cok | |
| 4,984,013 A | 1/1991 | Terashita | |
| 5,016,043 A | 5/1991 | Kraft et al. | |
| 5,452,105 A * | 9/1995 | Tamagaki et al. | 358/453 |
| 5,907,629 A * | 5/1999 | Funt et al. | 382/162 |
| 6,243,133 B1 * | 6/2001 | Spaulding et al. | 348/223.1 |
| 6,459,425 B1 * | 10/2002 | Holub et al. | 345/207 |
| 6,563,945 B2 * | 5/2003 | Holm | 382/162 |
| 6,628,823 B1 * | 9/2003 | Holm | 382/162 |
| 6,681,042 B1 * | 1/2004 | Weldy | 382/167 |
| 6,985,622 B2 * | 1/2006 | Hubel | 382/165 |
| 7,103,217 B2 * | 9/2006 | Haikin | 382/167 |
| 7,139,217 B2 * | 11/2006 | Scott | 367/20 |
| 7,207,645 B2 * | 4/2007 | Busch et al. | 347/19 |

OTHER PUBLICATIONS

Preffered Color Spaces for White Balancing, Xiao et al, XP-002364458, Dept of Psychology , Stanford University.*
Reference Input/ Output Medium Metric RGB color Encoding, Spaulding et al, Kodak Comapny, NY,USA.*

(Continued)

*Primary Examiner*—Samir Ahmed
*Assistant Examiner*—Nancy Bitar
(74) *Attorney, Agent, or Firm*—Raymond L. Owens

(57) ABSTRACT

A method for correcting the color balance of an input digital color image in an input color space captured under a capture illuminant to produce a balanced digital color image includes transforming the input digital color image to a balancing color space, wherein the balancing color space has three color channels corresponding to three color space primaries, the color space primaries being chosen so that minimal color errors can be produced when correcting the color balance for a set of one or more capture illuminants relative to aim colors that would be produced if the digital color image were captured under reference conditions; and correcting the color balance of the input digital color image in the balancing color space to produce a balanced digital color image having minimal color errors relative to aim colors that would be produced if the digital color image were captured under reference conditions.

48 Claims, 5 Drawing Sheets

OTHER PUBLICATIONS

Feng Xiao et al., Preferred Color Spaces for White Balancing, Conference on Sensors and Camera Systems for Scientific, Industrial and Digital Photography Applications IV and Proceedings of the SPIE—The International Society for Optical Engineering SPIE-Int. Soc. Opt. Eng USA, vol. 5017, Jan. 21, 2003, pp. 342-350, XP002364458.

H. R. Kang, Computational Accuracy of RGB Encoding Standards, IS&T's NIP16: Internation Conference on Digital Printing Technologies, Oct. 15, 2000, pp. 661-664, XP008058909.

K. E. Spaulding et al., Reference Input/Output Medium Metric RGB Color Encodings (RIMM/ROMM RGB), Proceedings of the Conference on Image Processing, Image Quality and Image Capture Systems, May 26, 2000, pp. 155-163, XP008034009.

G. Woolfe et al., Optimal Color Spaces for Balancing Digital Color Images, IS&T/SID Eleventh Color Imaging Conference, Nov. 3, 2003, pp. 66-70, XP008058893.

* cited by examiner

PRODUCING A BALANCED DIGITAL COLOR IMAGE HAVING MINIMAL COLOR ERRORS

FIELD OF THE INVENTION

This invention pertains to the field of digital image processing, and more particularly to the field of applying color balance corrections to digital images captured under different capture illuminants.

BACKGROUND OF THE INVENTION

Digital imaging systems are becoming increasingly common both in the field of still photography, as well as in the field of motion imaging as is evidenced by the proliferation of digital cameras and video recorders, as well as services for digitizing photographic film.

Color digital imaging devices generally utilize an array of color sensors to capture the image information. The sensors typically have spectral sensitivities that correspond roughly to the red, green and blue portions of the visible spectrum. Alternatively, sensors with other spectral sensitivities such as cyan, magenta and yellow, or cyan, magenta, yellow and green have also been used. Typically, the exposure values captured by the color sensors are integerized to form quantized color values (code values) and stored in memory for later processing. The later processing steps typically include color correction, as well as a variety of spatial processing steps such as sharpening and/or noise removal.

Sensors used for image capture, including both photographic film and solid state sensors, differ fundamentally from the human visual system in that they lack the ability to adapt to the ambient illumination. While the human visual system adapts to both the luminance and chromatic content of the scene illuminant, image capture systems require a number of compensation mechanisms to mimic such adaptation. These compensation mechanisms can be broadly divided into two classes—pre-exposure mechanisms and post-exposure mechanisms. Pre-exposure correction mechanisms can be thought of as "light altering" in that they change the light captured by the image sensor, whereas post-exposure correction mechanism can be thought of as "signal altering" in that they are used to modify the signal captured by the image sensor. Some degree of pre-exposure compensation to the average illumination level is accomplished using the exposure controls—aperture and shutter speed—available on most cameras. These controls provide a basic level of adjustment over the exposure given to the sensor(s), but they are seldom reliable enough to produce perfectly balanced pictures in every instance. Furthermore, camera exposure controls provide no mechanism for compensation for variations in the chromaticity of the ambient illumination. The only pre-exposure mechanism that attempts to correct for illuminant chromaticity is the use of color correction filters. Again, such corrections are generally only approximate since color correction filters are designed for specific discrete illuminant spectral power distributions.

Pre-exposure compensation mechanisms have historically relied on the skill and sophistication of the photographer for their success, but modern automatic exposure metering systems are able to achieve reasonably good results, even in the hands of a neophyte. Since pre-exposure compensation mechanisms only provide a partial solution to the problem of illuminant variability, most images require further compensation for the scene illuminant variability using post-capture mechanisms. There are numerous techniques available to accomplish such compensation. In the traditional silver-halide-negative photography arena, post-exposure illuminant compensation has been accomplished by adjustment of the enlarger or printer lamphouse filtration and control of the printing exposure. The magnitude of such adjustments can be determined by trial and error, or by algorithmic corrections based on statistical measurements of the negative transmittance. In some cases, the "post-exposure correction" may be specified before the exposure is made, as in the case of specifying white-balance gain corrections by selecting a white-balance setting on a digital camera. However, such corrections should not be confused with "pre-exposure corrections" since the corrections are not actually applied until after the image is captured.

Digital imaging opens up many additional possibilities for post-exposure illuminant compensation. Such compensation is generally performed using mathematical transforms applied to the digital image data. For example, white balance adjustments can be applied in a digital camera, or adjustment to the scanned densities of a color negative can be applied in a digital photofinishing system. These transforms are generally applied to a numerical encoding of the scene colors. Many such encodings—both device dependent and device independent—are available to represent colors.

The intent of balancing transforms in digital imaging applications is usually to modify the image in a manner that is consistent with the adaptation mechanisms in the human visual system. Typically, simple transforms consisting of either a multiplicative scaling factor (gain adjustment) in a linear color encoding or an additive shift in a logarithmic color encoding are used to map a particular visually neutral reference in the scene to a set of aim coordinates in the color encoding. The same transform that is used to map the reference neutral is also applied to all other colors in the image.

Since most scenes do not contain a reference neutral patch that can be used for the balancing operation, a neutral reference is usually estimated by analysis of the scene content. Algorithms that perform this scene analysis to determine an estimate of the necessary correction are sometimes referred to as "scene balance algorithms." (For example, see "Automatic Color Printing Techniques," Image Technology, April/May 1969, pp. 39-43; U.S. Pat. No. 4,101,217 assigned to AGFA-Gevaert A. G.; U.S. Pat. Nos. 4,707,119 and 4,984,013 assigned to Fuji Photo Film Co., Ltd.; U.S. Pat. No. 4,945,406 assigned to Eastman Kodak Company; and U.S. Pat. No. 5,016,043 assigned to Gretag Systems.) Scene balance algorithms can vary widely in their complexity, as well as in the accuracy of their results. They typically involve analyzing the distribution of overall exposure levels and relative color signal levels in an image to determine the appropriate level of exposure and color balance compensation that is needed. Frequently, these algorithms work by first computing a low-resolution version of the image and then analyzing that image.

Even if the balancing transform produces a perfectly balanced result for the reference neutral, the results obtained for other image colors may not be consistent with human visual system adaptation, and would therefore be perceived as an error. The extent of these errors is a function of the magnitude of the balancing correction (a function therefore of the scene illuminant) and of the color encoding in which the balancing transform is applied.

For example, consider the case where an image is captured by a digital imaging system under a 18,000K daylight illuminant, which might correspond to a shadow scene that was illuminated with blue skylight and no direct sunlight. If the imaging system were optimized to produce well-balanced imaged from a 5000K daylight source, the unbalanced image would have a significantly blue cast. Consider the case where a color balance correction is applied by transforming the image to a linear RGB color space having the primaries of the well-known sRGB color space, and scaling the resulting RGB values using multiplicative scale factors such that a neutral scene object were perfectly corrected. If the aim of the color balance correction is to produce an image that is identical to one where the scene were captured using the nominal 5000K daylight source, the color errors can be determined by computing the color difference between the aim colors and the balanced image colors. The RMS $\Delta E^*_{ab}$ color error calculated for a set of about 400 test patches corresponding to representative scene reflectance spectra, was found to be 12.07. FIG. 1 is a CIELAB a*-b* plot showing these color errors for each of the test patches.

If in the example above, the sRGB primaries were replaced by the primaries associated with the RIMM RGB color space described in ANSI/I3A IT10.7466 "Electronic Still Picture Imaging—Reference input medium metric RGB color encoding (RIMM-RGB)," the RMS $\Delta E^*_{ab}$ color error calculated for the same test patches, was found to be 9.40. FIG. 2 is a CIELAB a*-b* plot showing these color errors for each of the test patches. While this represents an improvement in the RMS color error over those associated with the sRGB primaries, they are still far from perfect.

Spaulding et al. have disclosed a method for applying scene balance corrections in a digital imaging system by transforming to a standard color space for performing the analysis of the digital image (see commonly-assigned U.S. Pat. No. 6,243,133). This method has the advantage that a single scene balance algorithm can be used for many different digital imaging devices without needing to retune the algorithm for each device. However, with the method of Spaulding et al., the actual correction step is applied to the digital image in the input color space. Therefore, the resulting color errors will have the same inherent characteristics as those resulting from applying the scene balance correction algorithm directly in the input color space.

SUMMARY OF THE INVENTION

It is an object of the present invention to provide an improved way to produce balanced digital color images having reduced color errors.

These objects are achieved by a method for correcting the color balance of an input digital color image in an input color space captured under a capture illuminant to produce a balanced digital color image comprising the steps of:

a) transforming the input digital color image to a balancing color space, wherein the balancing color space has three color channels corresponding to three color space primaries, the color space primaries being chosen so that minimal color errors can be produced when correcting the color balance for a set of one or more capture illuminants relative to aim colors that would be produced if the digital color image were captured under reference conditions; and b) correcting the color balance of the input digital color image in the balancing color space to produce a balanced digital color image having minimal color errors relative to aim colors that would be produced if the digital color image were captured under reference conditions.

The present invention has the advantage over the prior art that color errors resulting from the application of color balance correction operations can be minimized by performing the color balance operation in a color space optimized for this purpose. Using this approach it is possible to obtain more pleasing and realistic images with little or no increase in the complexity of the color balancing algorithm.

DETAILED DESCRIPTION OF THE INVENTION

Figure 3:
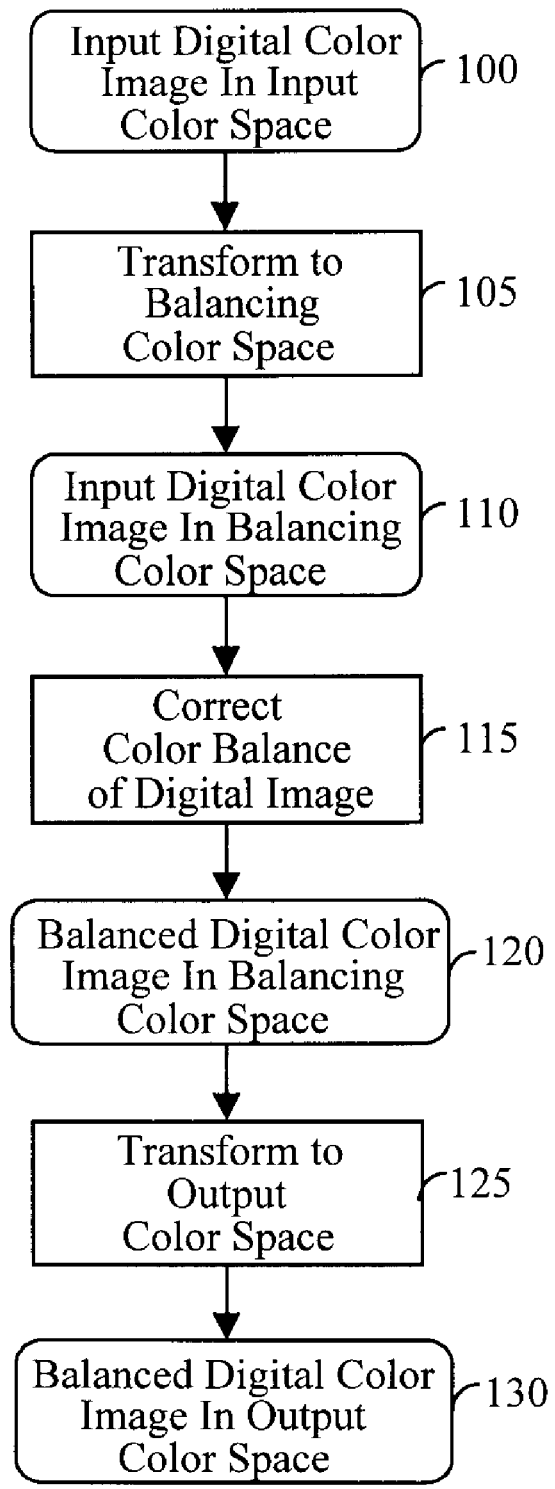
FIG. 3 is a flowchart showing a preferred method for applying color balance corrections in accordance with the present invention.

This invention represents a way for color balancing images in a way that minimizes the color errors associated with prior art color balance adjustment methods. Referring to FIG. 3, a flow diagram illustrating a preferred embodiment of the present invention is illustrated. With this method, an input digital color image in an input color space 100 has been captured under a capture illuminant. A transform to balancing color space step 105 is used to apply a color space transformation to the input digital color image in an input color space 100 to determine a corresponding input digital color image in the balancing color space 110, wherein the balancing color space has three color channels corresponding to three color space primaries, the color space primaries being chosen so as to produce minimal color errors when correcting the color balance for a set of one or more capture illuminants relative to aim colors that would be produced if the digital color image were captured under reference conditions. Next, a correct color balance of digital image step 115 is used to determine a balanced digital color image in the balancing color space 120. Finally, an optional transform to output color space step 125 is used to apply a color space transformation to determine a corresponding balanced digital color image in an output color space 130.

The various elements of the present invention will now be discussed in more detail. The input digital color image in an input color space 100 can be captured using a variety of different means. In one preferred embodiment of the present invention, the input digital color image in an input color space 100 is captured using a digital image capture device such as a digital camera. In another preferred embodiment of the present invention, the input digital color image in an input color space 100 is captured using photographic film and subsequently scanned using a film scanner. Other possible types of image capture devices can include video cameras, or reflection print scanners that are used to scan reflection prints. The method can also be applied to computer-generated images that are simulations of actual scene captures.

The input digital color image in an input color space 100 can be in a number of input color spaces. In one preferred embodiment of this invention, the input color space would be the capture color space of the image capture device. For example, it can be the fundamental sensor RGB color space for a digital camera, where each color channel would be associated with the spectral sensitivity of the individual sensor color channels. Similarly, the input color space can also be the capture color space associated with the fundamental sensor RGB color space for a film scanner, or the capture color space associated with the spectral sensitivities of a conventional photographic film material.

Alternatively, the input color space can be some intermediate color space to which the captured image had been transformed. For example, the input color space can be a standard device-dependent color space such as the well-known sRGB color space, or it can be a device-independent color space such as the well-known CIE XYZ or CIELAB color spaces. In such cases, a color transform is typically used to transform the captured digital image to the intermediate color space. In some cases, this transform may be well-defined and exact, whereas in other cases the color transform may be only an approximation. For example, consider the case of a digital camera. If the sensors in the digital camera have spectral sensitivities that are linear combinations of the CIE color matching functions, there will be a simple and exact relationship between the captured sensor RGB color values and the corresponding CIE XYZ color values for the scene. On the other hand, if the sensors in the digital camera have spectral sensitivities that cannot be represented by linear combinations of the CIE color matching functions, then any transformation to CIE XYZ would only produce an approximation of the actual scene color value due to sensor metamerism limitations. Methods for determining such approximate color transformations are well-known in the art, and typically involve some kind of error minimization process such as least squares.

For the current discussion, it will be assumed that the input digital color image is captured by a digital camera having spectral sensitivities that are linear combinations of the CIE color matching functions, and that the input digital color image has been transformed to the CIE XYZ color space by applying the appropriate matrix transformation to the linear sensor RGB color values. However, it should be noted that this method is not dependent on this condition, and can be applied equally well with other types of input color spaces and image capture devices.

The input digital image will be captured under some capture illuminant. Typically, most image capture devices are optimized for some reference illuminant, and therefore will produce a well-balanced image with accurate colors when a real scene is captured under this reference illuminant. However, when a scene is captured under a different capture illuminant, the input digital image will often not produce a desirable image unless a color balance correction is applied. For example, consider the case where an image capture device is optimized to produce a pleasing image under a daylight illuminant with a 5000K color temperature (e.g., CIE Illuminant D50). If this device is used to capture an image under a tungsten illuminant, the resulting image will typically look very "warm" if no color balance correction is applied due to the fact that tungsten illuminants have much more red content and much less blue content. Similarly, other types of illuminants such as fluorescent illuminants will also produce undesirable results if no color balance correction is applied. Even images captured under daylight illumination with different color temperatures (for example at different times of day, or under different sky conditions, etc.) may also produce undesirable images.

While the human visual system automatically adapts to changes in the viewing illumination, photographic imaging systems need to include a color balance correction step to be able to provide desirable images under a variety of different capture illuminants. In a conventional film-based photographic system, the color balance correction step is typically applied when a photographic negative is printed using an optical enlarger by adjusting the filtration to compensate for the color balance error. For example, the filtration can be adjusted to shift the color balance of an image captured under a tungsten illuminant to shift it in a blue direction. In digital imaging systems, the color balance correction step can either be implemented by adjusting the analog gains for the sensor circuitry, or by using a post-capture digital image processing operation. When a post-capture digital image processing operation is used, this commonly involves applying multiplicative color balance scale factors to each of the color channels of the digital image. (Or if a logarithmic color encoding is used, color balance offset values are added to each of the color channels.)

The goal of the correct color balance of digital image step 115 in the present invention is typically to adjust the color values so that a neutral gray object in the scene is mapped to the same color values that it would have been mapped to if the digital color image were captured under reference conditions. For example, many digital cameras are designed such that a neutral object will produce equal RGB color values when the scene is captured under a reference illuminant. However, if the scene is captured under some other illuminant, the RGB color values will no longer be equal. Most color balance correction operations will simply apply multiplicative color balance scale factors to the individual RGB color channels such that the neutrals will once more have equal code values. (Typically, these color balance scale factors are applied to radiometrically linear RGB values, but they can also be applied to RGB values that have been encoded using a power-function type nonlinearity.)

The color balance scale factors are typically estimated using automatic color balance estimation algorithms to analyze the captured scene. For example, the assumption is sometimes made that typical scenes will average to gray. In that case, the appropriate color balance scale factors can be estimated by computing the average RGB values for the image, then determining the gain values that would be necessary to equate them. However, simple algorithms like this are easily fooled, which has led to the development of more sophisticated methods for estimating the appropriate color balance scale factors. The details of these algorithms are beyond the scope of this discussion, but any such method can be used for the method of the present invention.

In some cases, a manual scene balance operation can be used where a user interface is provided that enables a user to specify a desired color balance correction. For example, the user interface can include a series of color balance slide bars or a mechanism allowing the user to click on a neutral object in the image.

In some cases, information may be available about the scene illumination that can be used to determine the appropriate color balance correction. For example, if a digital camera fires its flash, this information can be used to determine appropriate color balance scale factors since the scene illumination will have a known spectral composition. Alternatively, information about the scene illumination can be determined from color temperature sensors on the camera, or the user can specify the appropriate scene illumination type by selecting from a list of typical scene illuminants.

It should be noted that the color balance correction operation may be used to provide color balance modifications beyond those necessary to simply account for the capture illuminant variability. For example, the imaging system may include other sources of variability that would affect the overall color balance of the image, such as sensor/film sensitivity variability, film processing variability, etc. The color balance correction operation can also be used to apply a user-specified color balance adjustment to satisfy the preferences of a particular individual or a group of individuals. Such preferences can be specified on an image-by-image basis, or as an overall color balance bias that should be applied to all images.

As was noted earlier in the Background of the Invention section, a color balance correction that perfectly corrects the neutral scene elements can still produce undesirable distortions for other colors in the scene. For example, the hue of a blue sky might go purplish, or a yellow object may become de-saturated and turn greenish. The most objectionable errors are typically associated with hue and/or saturation errors for various memory colors, which can result in unnatural looking images. Problems can become particularly apparent when the color balancing operation causes the color name to change. The method of the present invention is designed to minimize these problems by applying the correct color balance of digital image step 115 in a balancing color space that has been optimized to preserve the color accuracy. In particular, the balancing color space has three color channels corresponding to three color space primaries, the color space primaries being chosen so as to produce minimal color errors when correcting the color balance for a set of one or more capture illuminants.

After the correct color balance of digital image step 115 is used to determine a balanced digital color image in the balancing color space 120, an optional transform to output color space step 125 can be used to apply a color space transformation to determine a corresponding balanced digital color image in an output color space 130. In some cases, it may be desire to transform the balanced digital color image back to the input color space. In this case, the output color space is equal to the input color space. Alternatively, it may be desirable to transform the balanced digital color image to some other output color space. For example, it may be desirable to transform to an output color space associated with a standard output device such as an sRGB video display.

Figure 4:
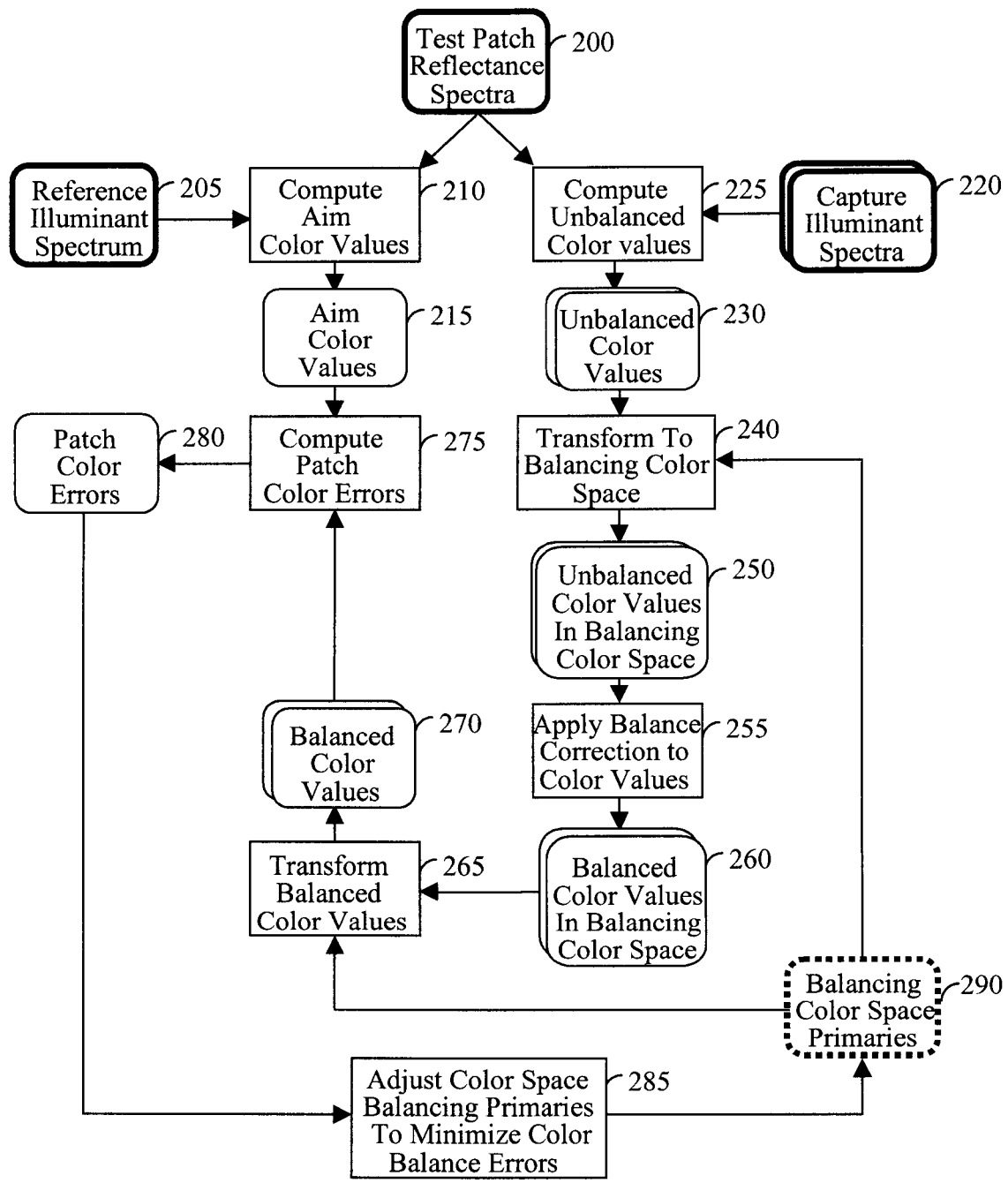
FIG. 4 is a flowchart showing a preferred method for determining balancing color space primaries according to the method of the present invention.

Referring now to FIG. 4, an optimal set of balancing color space primaries can be determined in accordance with the present invention will now be described in more detail. In this method, the color errors are minimized for a set of input test patches characterized by a set of test patch reflectance spectra 200. Aim color values 215 for the set of test patches are determined using a compute aim color values step 210. The aim color values 215 are typically determined using a reference illuminant spectrum 205 corresponding to the design illuminant for the image capture system together with the test patch reflectance spectra 200. In one preferred embodiment of this invention, the aim color values 215 are defined by the CIE XYZ color space values for the test patches as viewed under the reference illuminant. The CIE XYZ color space values can be determined using straightforward calculations familiar to those skilled in the art. The aim color values 215 can be expressed directly in terms of the CIE XYZ values, or alternatively, they can be converted to some other color space. For example, they can be expressed in terms of the well-known CIELAB or CIELUV color spaces, or in terms of color appearance metrics using any one of a number of color appearance spaces familiar to those skilled in the art (e.g., CIECAM2000).

Alternatively, the aim color values 215 can be determined using a number of other methods. For example, in one embodiment of the present invention aim color values 215 can be determined corresponding to the color values captured by a reference image capture device having a specified set of spectral sensitivities. In another embodiment of the present invention, the aim color values 215 can be determined from the test patch reflectance spectra and a particular capture illuminance spectrum by determining the CIE XYZ values of the patches under the capture illuminant, and then using a chromatic adaptation transform to determine corresponding CIE XYZ color values that would be required to produce the same patch color appearance under the reference illuminant. There are many different types of chromatic adaptation transforms that can be used that are familiar to those skilled in the art.

In a preferred embodiment of the present invention, the set of test patch reflectance spectra 200 will include a representative sampling of reflectance spectra that would be encountered in real scenes that are relevant to the particular application. Generally, it will be desirable that the test patches include colors that are distributed throughout color space, as well as important memory colors such as human skin tones, foliage, etc. It will usually be useful to also include a series of non-selective neutral patches. (These can be used for determining the appropriate color balance corrections for a given capture illuminant.)

Next, a compute unbalanced color values step 225 is used to determine a set of unbalanced color values 230 from a set of one or more capture illuminant spectra 220, and the same set of input test patch reflectance spectra 200. In a preferred embodiment of the present invention, the unbalanced color values are defined by the CIE XYZ color space values for the test patches as viewed under each of the capture illuminant spectra 220. As was discussed with reference to the computation of the aim color values 215, the unbalanced color values 230 can be expressed in any one of a multiplicity of different color spaces, including device-dependent color spaces for a reference image capture device having a specified set of spectral sensitivities.

The set of capture illuminant spectra 220 should include a representative sampling of capture illuminants that are relevant to the particular application. Examples of illuminants that would be typically encountered in photographic scenes would include daylight illuminants, tungsten illuminants, blackbody illuminants, fluorescent illuminants, and electronic flash illuminants. Each of these different types of illuminants may be represented at one or more different color temperatures. In some applications, there may be only one illuminant that is of particular interest. For example, if a photographic application uses well controlled studio illumination, the set of capture illuminant spectra 220 would only need to include that particular illuminant. In other applications, the illuminants can be expected to vary quite widely. In those cases, it will generally be desirable to include a diverse set of illuminants in the set of capture illuminant spectra 220. In some applications, there may be special illumination conditions that can be accounted for. For example, for underwater photography, the illumination will usually be daylight that has been filtered by various depths of water. In this case, effective underwater illuminants can be defined corresponding to the product of the illuminant spectra and the spectral transmittance of the water.

Next, a transform to balancing color space step 240 is used to transform the unbalanced color values 230 to corresponding unbalanced color values in the balancing color space 250. The balancing color space is an additive RGB color space, having three color channels corresponding to three balancing color space primaries 290. Such additive RGB color spaces will have a simple linear matrix relationship to CIE XYZ tristimulus values. The three color space primaries are usually defined in terms of their CIE x-y chromaticity coordinates. For cases where the unbalanced color values 230 are represented in terms of a color space derived from CIE colorimetry, there will be a straightforward and exact transformation between the unbalanced color values 230 and the corresponding unbalanced color values in the balancing color space 250. For example, if the unbalanced color values 230 are expressed as CIE XYZ color values, a simple linear 3×3 matrix transformation can be used to determine the corresponding balancing color space color values. This matrix can be determined from the chromaticity coordinates of the balancing color space primaries 290 and chromaticity values for a balancing color space white point using methods well-known to those skilled in the art. Typically, the balancing color space white point will be defined to be consistent with the reference illuminant spectra 205, although this is not a requirement.

For cases where the unbalanced color values 230 are represented in terms of a device-dependent color spaces for a reference image capture device having a specified set of spectral sensitivities, there will generally not be an exact relationship between the unbalanced color values and CIE XYZ values due to sensor metamerism issues. In such cases, an approximate transformation to CIE XYZ color values can be determined using well-known modeling techniques such as least squares error minimization. The resulting CIE XYZ values can then be transformed to the balancing color space using the simple linear 3×3 matrix transformation discussed above.

Depending on the chromaticity coordinates of the balancing color space primaries 290, some of the unbalanced color values may have negative RGB values for one or more color values when transformed to the balancing color space. For the purposes of these calculations, there is no need to clip these negative values that would limit the color gamut of the colors that can be represented. Likewise, some of the unbalanced color values may have RGB values greater than 1.0 for one or more color values when transformed to the balancing color space. These also can be preserved in order to not impose any gamut limitations.

In some cases, it may be desirable to apply a nonlinear encoding function to the balancing color space color values. This is particularly true when it is desired to use an integer digital representation. Typically "gamma functions" or logarithmic nonlinearities are used in such cases. These types of functions have the advantage that the code values are more uniformly distributed visually than linear encoding functions. (It will generally be desirable to utilize nonlinear encoding functions that preserve the extended range color values as was noted above.)

At this point, the optimal balancing color space primaries 290 have not yet been determined. Therefore, it is necessary to make some initial guess at their chromaticity coordinates. The particular initial chromaticity coordinates that are assumed are not particularly important provided that a robust optimization process is used to determine the optimal values. An example of a set of initial primary values that can be assumed would be (0.0, 0.0), (0.0, 1.0) and (1.0, 0.0).

Returning to a discussion of FIG. 4, an apply balance correction to color values step 255 is next used to determine balanced color values in the balancing color space 260. In a preferred embodiment of the present invention, this is accomplished by applying multiplicative color balance scale factors to each of the color channels of the unbalanced color values in the balancing color space 250 to form balanced color values in the balancing color space 260. The multiplicative color balance scale factors appropriate for a given capture illuminant can be most easily determined by computing the ratios of the unbalanced color values in the balancing color space 250 for a spectrally non-selective neutral patch to the corresponding color values for the reference illuminant. In equation form, the multiplicative color balance scale factors $F_R$, $F_G$ and $F_B$ for the three color channels of the balancing color space can be determined by:

$$F_R = \frac{R_{K,ref}}{R_{K,cap}}$$

$$F_G = \frac{G_{K,ref}}{G_{K,cap}}$$

$$F_B = \frac{B_{K,ref}}{B_{K,cap}}$$

where ($R_{K,ref}$, $G_{K,ref}$, $B_{K,ref}$) are the color values in the balancing color space 250 for the spectrally non-selective neutral patch for the reference illuminant, and ($R_{K,cap}$, $G_{K,cap}$, $B_{K,cap}$) are the color values in the balancing color space 250 for the spectrally non-selective neutral patch for the capture illuminant. (If the white point of the balancing color space corresponds to the reference illuminant, then $R_{K,ref}$, $G_{K,ref}$ and $B_{K,ref}$ should all be equal.) Other forms of transforms may be appropriate for use in the apply balance correction to color values step 255 as well, particularly for the case where a nonlinear encoding is used for the balancing color space.

After applying the apply balance correction to color values step 255 all spectrally non-selective patches in the set of test patches should be perfectly corrected. However, as was discussed earlier, the color values for non-neutral colors can have significant distortions introduced into them. To evaluate the magnitude of these color errors, a compute balanced color values step 265 is used to determine balanced color values 270 by converting the balanced color values in the balancing color space 260 to the same color space that was used to represent the aim color values 215. This transformation will be a function of the balancing color space primaries 290.

Next, patch color errors 280 are determined using a compute patch color errors step 275. There are many different ways that they patch color errors 280 can be determined. In a preferred embodiment of the present invention, the patch color errors are determined by computing color differences in a so-called uniform color space such as CIELAB or CIELUV. This is accomplished by first transforming the aim color values 215 and the balanced color values 270 to the uniform color space, and then determining the color difference values for each of the test patches and each of the illuminants. The color difference values can be determined using a color difference metric such as CIE $\Delta E^*_{ab}$:

$$\Delta E^*_{ab} = \sqrt{(L^*_{aim} - L^*_{bal})^2 + (a^*_{aim} - a^*_{bal})^2 + (b^*_{aim} - b^*_{bal})^2}$$

where $L^*_{aim}$, $a^*_{aim}$ and $b^*_{aim}$ are the CIELAB coordinates for the aim color values 215 and $L^*_{bal}$, $a^*_{bal}$ and $b^*_{bal}$ are the CIELAB coordinates for the balanced color values 270. Other uniform color difference metrics such as the well-known CIE $\Delta E^*_{94}$ can also be used. Similarly, color differences can also be determined between color values expressed in terms of a color appearance space such as CIECAM2000.

The color errors for the various test patches and capture illuminants can be combined to determine a color error cost function. In a preferred embodiment of the present invention, the cost function is determined by averaging the patch color errors 280 across all of the patches and all of the capture illuminants.

$$\cos t = \frac{1}{N_P N_I} \sum_{i=1}^{N_P} \sum_{j=1}^{N_I} \Delta E^*_{i,j}$$

where $\Delta E^*_{i,j}$ is the patch color error for the $i^{th}$ test patch and the $j^{th}$ capture illuminant, $N_P$ is the number of test patches, and $N_I$ is the number of capture illuminants. Variations of this basic cost function would include weighting color patches for more important colors more heavily than for other colors and/or weighting the color errors for more important capture illuminants more heavily than for other capture illuminants. For example, it might be desirable to weight color errors for skin tones more heavily since those colors are more important to human observers. Similarly, it might be desirable to weight the most common capture illuminants more heavily than less common capture illuminants. It will be obvious to one skilled in the art that many different forms of cost functions can also be used in accordance with the present invention. For example, it might be desirable to weight hue errors more heavily than lightness errors, or it might be desirable to combine the patch color errors using other methods besides simple arithmetic means.

Finally, an adjust color space balancing primaries to minimize color balance errors step 285 is used to determine an optimal set of balancing color space primaries 290. In a preferred embodiment of the present invention this is done by finding the set of balancing color space primaries 290 that minimize the color error cost function. There are many nonlinear optimization techniques that are well-known in the art for minimizing cost functions such as those described herein. Many of these techniques involve iteratively adjusting the chromaticities of the balancing color space primaries 290 and evaluating the cost function to determine which adjustments reduce the value of the cost function. The iteration process is repeated until the minimum cost function value is identified. An example of such a nonlinear optimization technique is the well-known Levenberg-Marquardt algorithm.

It may be useful to incorporate a number of constraints into the nonlinear optimization process. For example, it may be desirable to constrain the positions of the balancing color space primaries 290 so that they are spread widely enough to encompass a set of important scene colors so as not to cause any substantial color gamut limitations on input digital color images when they are converted to the balancing color space. It may also be desirable to constrain the positions of the balancing color space primaries 290 so that the chromaticity coordinates are within certain ranges (e.g., 0<x<1 and 0<y<1).

The cost function minimization technique described herein was used to determine optimal balancing color space primaries for a typical photographic application. For this example, a set of several hundred real-world object reflectance spectra were used for test patch reflectance spectra 200. CIE Illuminant D50 was used for the reference illuminant spectra 205. A number of different sets of capture illuminant spectra 220 were evaluated, including daylight, blackbody and fluorescent illuminants. A Levenberg-Marquardt nonlinear optimization algorithm was used to identify the optimal set of balancing color space primaries 290, by minimizing a color error cost function comprising the average color error for the set of test patches expressed in terms of CIE $\Delta E^*_{ab}$.

The following table shows the resulting CIE x-y chromaticity coordinates for the optimal balancing color space primaries 290 corresponding to several different sets of common capture illuminant spectra 220. This set of illuminants spans a range of illuminants that are likely to be encountered in conventional photography. The set of balancing color space primaries corresponding to the pooled results for all of the illuminant sets shown in the table should perform well for most general photography applications. The chromaticity coordinate ranges indicated in the table would be representative of those that would be expected for the optimized sets of balancing color space primaries 290 given the types of capture illuminants and the cost function used for this example. However, the values can vary beyond these ranges depending on the particular set of illuminants that were included in the set, as well as the set of test patches and exact form of the cost function and optimization constraints.

|  | Primary 1 | | Primary 2 | | Primary 3 | |
| --- | --- | --- | --- | --- | --- | --- |
| Capture Illuminants | x | y | x | y | x | y |
| CIE Standard Daylight (4,000 K-9,000 K) | 0.667 | 0.333 | 0.225 | 0.727 | 0.115 | 0.020 |
| CIE Standard Daylight (4,000 K-18,000 K) | 0.659 | 0.341 | 0.229 | 0.720 | 0.113 | 0.019 |
| Blackbody Radiators (2,000 K-4,500 K) | 0.681 | 0.320 | 0.248 | 0.713 | 0.112 | 0.045 |
| Pooled Results for All Illuminant Sets | 0.67 ± 0.03 | 0.33 ± 0.03 | 0.23 ± 0.03 | 0.72 ± 0.02 | 0.11 ± 0.01 | 0.03 ± 0.03 |

Figure 1:
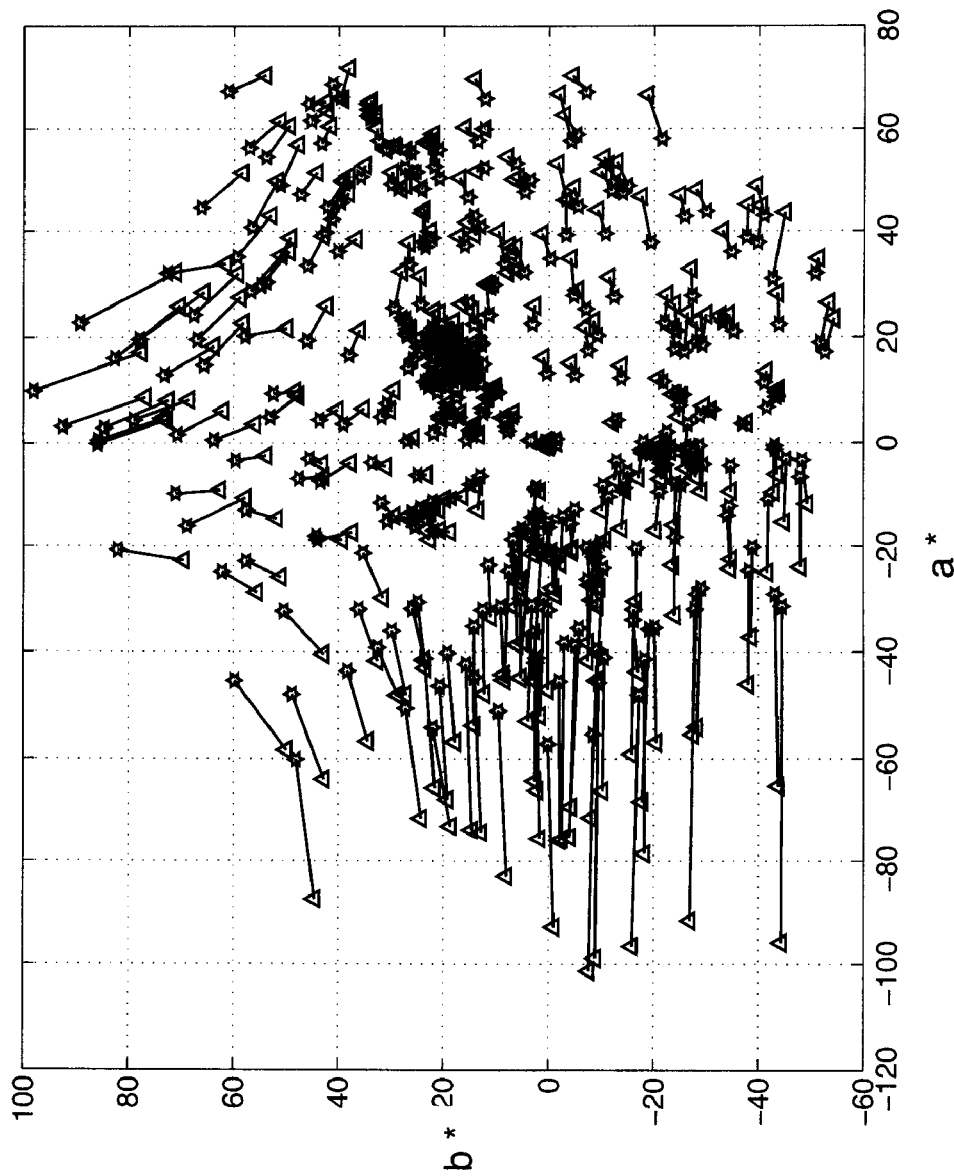
FIG. 1 is a CIELAB a*-b* plot showing the color errors obtained when a color balance correction is applied to a color space with the prior art sRGB color space primaries.
Figure 2:
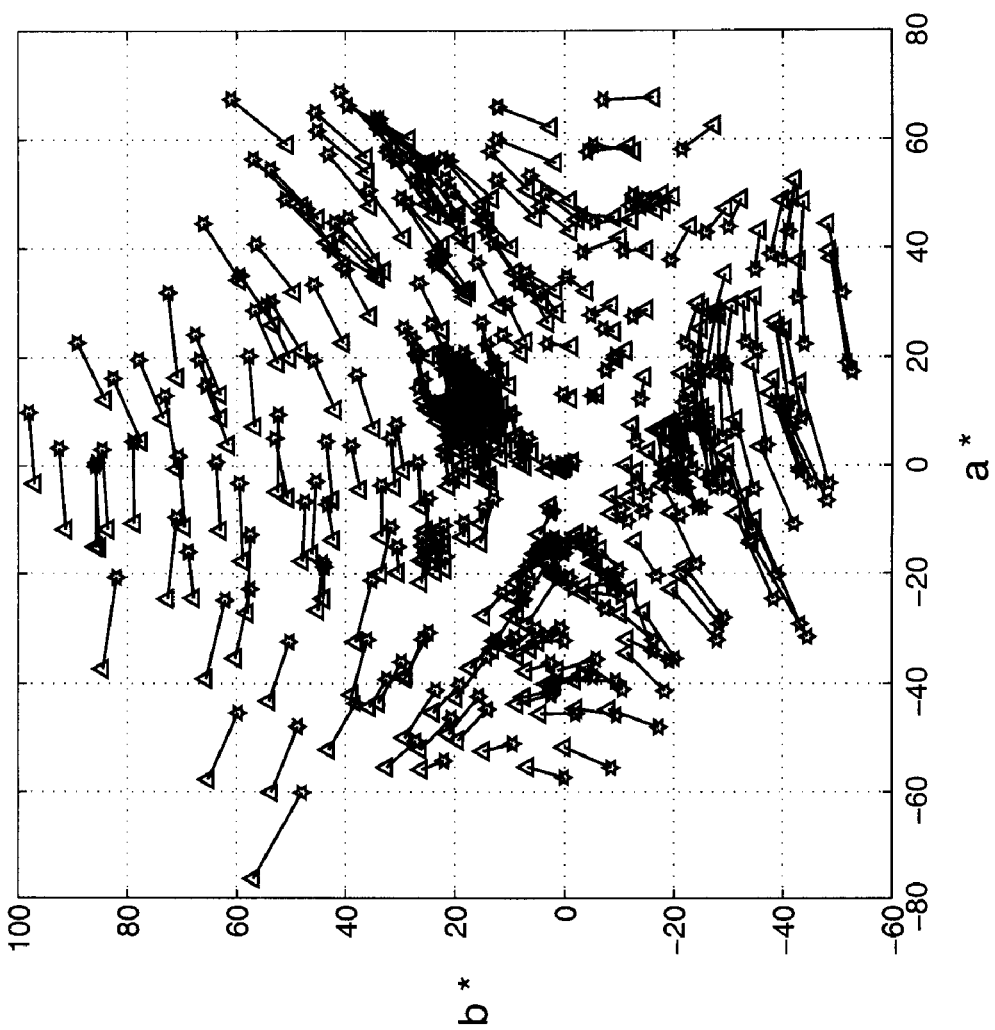
FIG. 2 is a CIELAB a*-b* plot showing the color errors obtained when a color balance correction is applied to a color space with the prior art RIMM RGB color space primaries.
Figure 5:
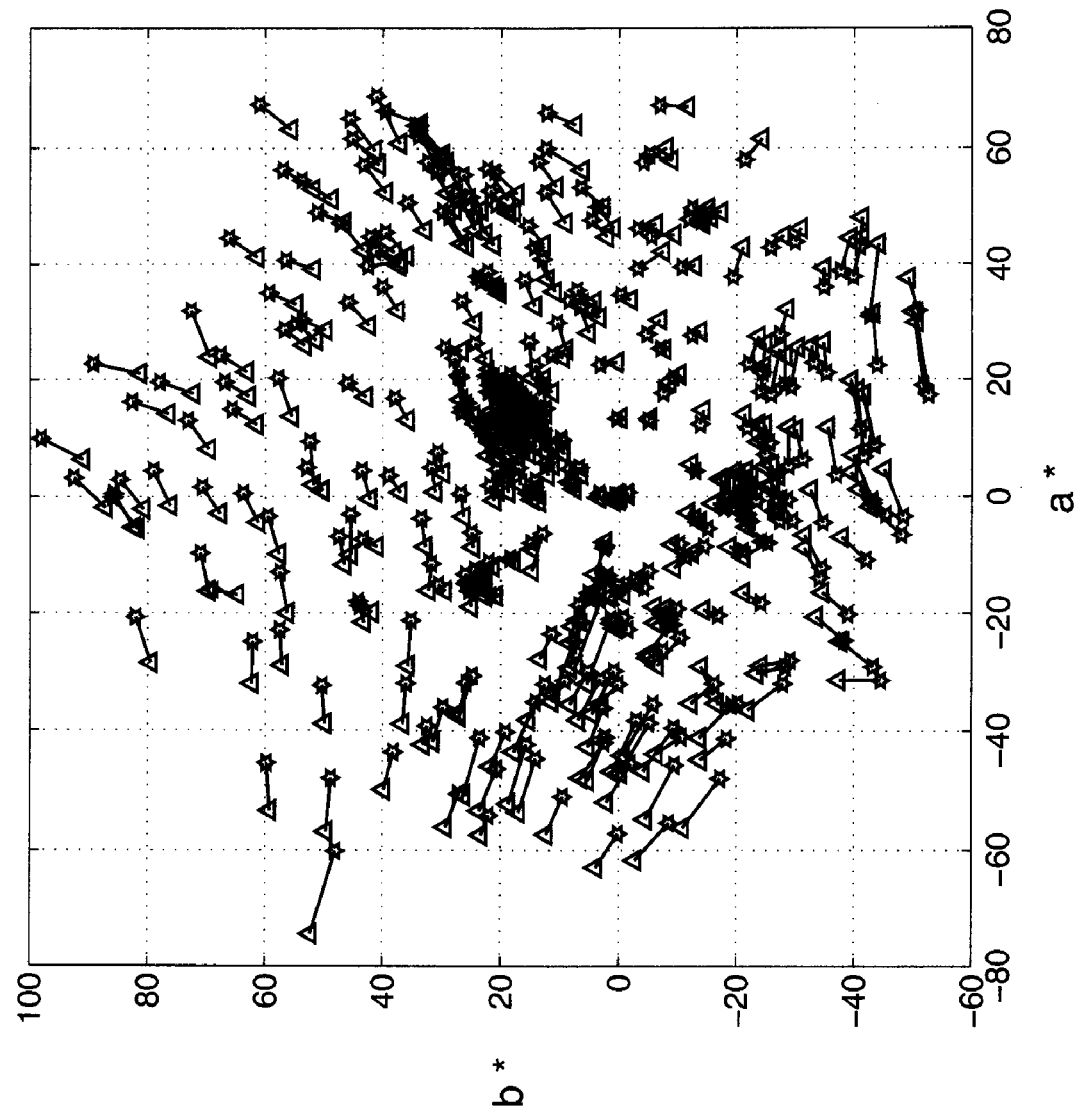
FIG. 5 is a CIELAB a*-b* plot showing the color errors obtained when a color balance correction is applied to a color space with optimized balancing color space primaries in accordance with the present invention.

The resulting color errors can be calculated for these pooled optimized balancing color space primaries 290 using the same method and set of test patches that were discussed above with reference to FIGS. 1 and 2. In this case, the RMS $\Delta E^*_{ab}$ color error is found to be 5.37, which is significantly improved relative to the prior art color space primaries. FIG. 5 is a CIELAB a*-b* plot showing the color errors for each of the test patches in the set. It can be seen that the magnitude of the color errors is much smaller than those found in FIGS. 1 and 2.

In some cases, it might be desirable to use a set of capture illuminants optimized for particular applications. For example, the following table shows the optimized primaries that would correspond to a range of different fluorescent capture illuminants.

|  | Primary 1 | | Primary 2 | | Primary 3 | |
|---|---|---|---|---|---|---|
| Capture Illuminants | x | y | x | y | x | y |
| Standard Fluorescent Illuminants (F2-F12) | 0.663 | 0.330 | 0.323 | 0.677 | 0.103 | 0.094 |

The method of the present invention can be applied in many different applications. For example, it can be built into a digital camera system. In this case, the input digital color image captured in the device-dependent sensor color space can be transformed to the balancing color space, where the color balance correction is applied. The balanced digital color image can then be transformed to an output color space such as sRGB. These operations can either be applied inside the digital camera so that the output of the digital camera is a properly balanced image, or alternatively, the balancing operations can be applied in a host computer that accepts unbalanced images from the digital camera.

The method of the present invention is also appropriate for use in digital photofinishing systems. The source of images in such systems can be conventional photographic negatives that are scanned to produce input digital color images. Alternatively, images can come into such systems from sources such as scans of photographic prints or slides, or from digital cameras. Digital photofinishing systems typically produce prints on digital printing devices, although they can also produce digital images appropriate for storing on a computer readable storage medium. The computer readable storage medium can comprise, for example; magnetic storage media such as magnetic disc (such as a floppy disc) or magnetic tape; optical storage media such as optical disk, optical tape, or machine readable bar code; solid state electronic storage devices such as random access memory (RAM), or read only memory (ROM); or any other physical device or medium employed to store digital images.

A computer program product having a computer readable storage medium can have a computer program stored thereon for performing all the steps of the present invention. The computer readable storage medium can comprise any physical device or medium employed to store a computer program including the examples mentioned earlier.

The invention has been described in detail with particular reference to certain preferred embodiments thereof, but it will be understood that variations and modifications can be effected within the spirit and scope of the invention.

PARTS LIST 100 input digital color image in an input color space
105 transform to balancing color space step
110 input digital color image in the balancing color space
115 correct color balance of digital image step
120 balanced digital color image in the balancing color space
125 transform to output color space step
130 balanced digital color image in an output color space
200 test patch reflectance spectra
205 reference illuminant spectrum
210 compute aim color values step
215 aim color values
220 capture illuminant spectra
225 compute unbalanced color values step
230 unbalanced color values
240 transform to balancing color space step
250 unbalanced color values in the balancing color space
255 apply balance correction to color values step
260 balanced color values in the balancing color space
265 compute balanced color values step
270 balanced color values
275 compute patch color errors step
280 patch color errors
285 adjust color space balancing primaries to minimize color balance errors step
290 balancing color space primaries

What is claimed is:

1. A method for correcting the color balance of an input digital color image in an input color space captured under a capture illuminant to produce a balanced digital color image comprising the steps of:
   a) choosing three color space primaries for a balancing color space so that reduced color errors can be produced when correcting the color balance in the balancing color space for a set of one or more capture illuminants relative to aim colors that would be produced if the digital color image were captured under reference conditions;
   b) transforming the input digital color image to the balancing color space, wherein the balancing color space has three color channels corresponding to the three color space primaries; and
   c) correcting the color balance of the input digital color image in the balancing color space to produce a balanced digital color image having reduced color errors relative to aim colors that would be produced if the digital color image were captured under reference conditions.

2. The method of claim 1 wherein the set of capture illuminants is a set of illuminants that would typically encountered in photographic scenes.

3. The method of claim 1 wherein the set of capture illuminants includes one or more daylight illuminants of various color temperatures.

4. The method of claim 1 wherein the set of capture illuminants includes one or more tungsten illuminants of various color temperatures.

5. The method of claim 1 wherein the set of capture illuminants includes one or more blackbody illuminants of various color temperatures.

6. The method of claim 1 wherein the set of capture illuminants includes one or more fluorescent illuminants of various color temperatures.

7. The method of claim 1 wherein the set of capture illuminants includes one or more electronic flash illuminants.

8. The method of claim 1 wherein the set of capture illuminants includes one or more illuminants corresponding to underwater illumination where an illuminant spectrum has been modified by the spectral transmittance of water.

9. The method of claim 1 wherein the color space primaries producing reduced color errors are determined by minimizing a cost function.

10. The method of claim 9 wherein the cost function is the average color errors for a set of test color patches captured with the set of capture illuminants.

11. The method of claim 10 wherein the color patches for more important colors are weighted more heavily than for other colors.

12. The method of claim 10 wherein the color errors for more important capture illuminants are weighted more heavily than for other capture illuminants.

13. The method of claim 1 wherein the cost function is minimized using a nonlinear optimization process.

14. The method of claim 1 wherein the input color space corresponds to the capture color space of an image capture device.

15. The method of claim 1 wherein the input color space corresponds to the capture color space for a photographic film.

16. The method of claim 1 wherein the color errors are computed by determining color differences in an approximately visually uniform color space.

17. The method of claim 15 wherein the color differences are determined in the CIELAB color space.

18. The method of claim 1 wherein the color errors are computed using a uniform color difference metric.

19. The method of claim 18 wherein the uniform color difference metric is $\Delta E^*_{94}$.

20. The method of claim 1 wherein the balancing color space is an additive RGB color space having a matrix relationship with CIE XYZ tristimulus values.

21. The method of claim 20 wherein a additive RGB color space further includes a nonlinear encoding function that is applied to each color channel of the balancing color space.

22. The method of claim 1 wherein step b) includes applying multiplicative color balance scale factors to each of the color channels of the input digital color image in the balancing color space to form the balanced digital color image.

23. The method of claim 1 wherein step b) includes adding color balance offset values to each of the color channels of the input digital color image in the balancing color space to form the balanced digital color image.

24. The method of claim 1 wherein step b) further includes the step of applying an automatic color balance estimation algorithm to the input digital image to estimate the required color balance correction.

25. The method of claim 1 wherein step b) further includes a user interface that enables a user to specify a desired color balance correction.

26. The method of claim 1 wherein step b) further includes the step of using information about the scene illumination to estimate the required color balance correction.

27. The method of claim 1 wherein the color space primaries are selected so as not to cause any substantial color gamut limitations on the input digital color image in the balancing color space.

28. The method of claim 1, further including the step of transforming the balanced digital color image in the balancing color space back to the input color space to produce a balanced digital image in the input color space.

29. The method of claim 1, further including the step of transforming the balanced digital color image in the balancing color space to an output color space to produce a balanced digital image in the output color space.

30. The method of claim 1, wherein the color space primaries are chosen subject to one or more constraints.

31. The method of claim 30 wherein the color space primaries are constrained to encompass a set of important colors.

32. The method of claim 30 wherein chromaticity coordinates for the color space primaries are constrained to be within a specified range.

33. The method of claim 1 wherein the input digital color image is an image captured using a digital camera.

34. The method of claim 1 wherein the input digital color image is an image captured by scanning a photographic negative.

35. The method of claim 1 wherein the input digital color image is an image captured by scanning a photographic print.

36. The method of claim 1 wherein the input digital color image is an image captured by scanning a photographic transparency.

37. The method of claim 1 wherein the input digital color image is an image captured using a video camera.

38. The method of claim 1 further including the step of printing the balanced digital color image on a digital printing device.

39. The method of claim 1 further including the step of storing the balanced digital color image on a computer readable storage medium.

40. A digital photofinishing system for producing prints of input images on a digital printing device wherein the method of claim 1 is used to correct the color balance of the input images.

41. The method of claim 1 wherein the color errors are minimized relative to aim color values corresponding to the CIE colorimetry of input colors captured with a reference illuminant.

42. The method of claim 1 wherein the color errors are minimized relative to aim color values corresponding to the CIE colorimetry of input colors captured with the capture illuminant and then chromatically adapted to a reference illuminant.

43. The method of claim 1 wherein the color errors are minimized relative to aim color values corresponding to color values captured under a reference illuminant using a reference image capture device having a specified set of spectral sensitivities.

44. The method of claim 1 wherein the color errors are minimized relative to aim color values expressed in terms of a color appearance metric for input colors captured with a reference illuminant.

45. The method of claim 1 wherein the balancing color space producing reduced color errors has a first color space primary with CIE x-y chromaticity values of (0.67±0.03, 0 33±0.03), a second color space primary with CIE x-y chromaticity values of (0.23±0.03, 0.72±0.02) and a third color space primary with CIE x-y chromaticity values of (0.11±0.01, 0.03±0.03).

46. The method of claim 1, further including a user-specified color balance adjustment.

47. The method of claim 1, wherein the color balance correction is used to correct for other sources of color balance error in addition to capture illuminant variability.

48. A computer program product, comprising a computer readable storage medium having therein a program for practicing the method of claim 1.

* * * * *

UNITED STATES PATENT AND TRADEMARK OFFICE
CERTIFICATE OF CORRECTION

PATENT NO. : 7,298,892 B2  
APPLICATION NO. : 10/410550  
DATED : November 20, 2007  
INVENTOR(S) : Kevin E. Spaulding et al.

It is certified that error appears in the above-identified patent and that said Letters Patent is hereby corrected as shown below:

Column 16, lines 3 and 4 of claim 45    "(0.67 ± 0.03, 033 ± 0.03)" should read --(0.67 ± 0.03, 0.33 ± 0.03)--

Signed and Sealed this

Thirteenth Day of May, 2008

JON W. DUDAS  
*Director of the United States Patent and Trademark Office*